Figure 1:
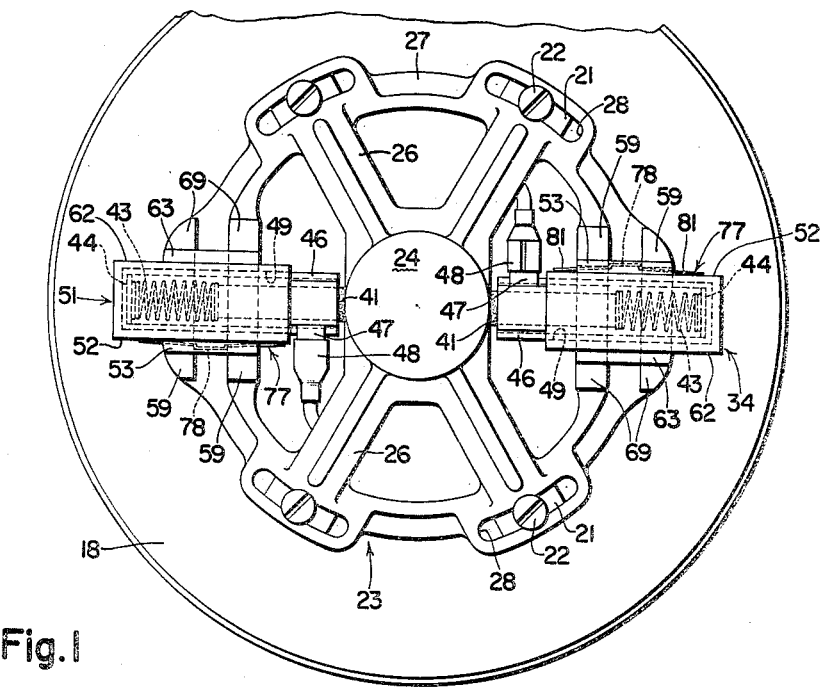

INVENTOR.
Albert N. Cook

April 6, 1965  A. N. COOK  3,177,388
BRUSH HOLDER ASSEMBLY FOR ELECTRIC MOTOR
Filed March 18, 1960  2 Sheets-Sheet 2

WITNESS
William Martin

INVENTOR.
Albert N. Cook
BY
Marshall J. Breen
ATTORNEY

United States Patent Office 3,177,388
Patented Apr. 6, 1965

3,177,388
BRUSH HOLDER ASSEMBLY FOR ELECTRIC MOTOR
Albert N. Cook, Bernardsville, N.J., assignor to The Singer Company, a corporation of New Jersey
Filed Mar. 18, 1960, Ser. No. 15,960
17 Claims. (Cl. 310—247)

This invention relates to electric motors and more particularly to an improved brush holder assembly designed to become part of an electric motor, and the primary object of the present invention is to provide an improved deivce of this character.

Another object of the present invention is to provide an improved means for supporting a brush holder and brush in the end bell of an electric motor.

A further object of the invention is to provide an improved means whereby a brush may easily be installed and quickly removed from an electric motor.

A still further object of the invention is to provide an improved means of locking and unlocking a brush holder to and from a motor end bell.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

Figure 2:
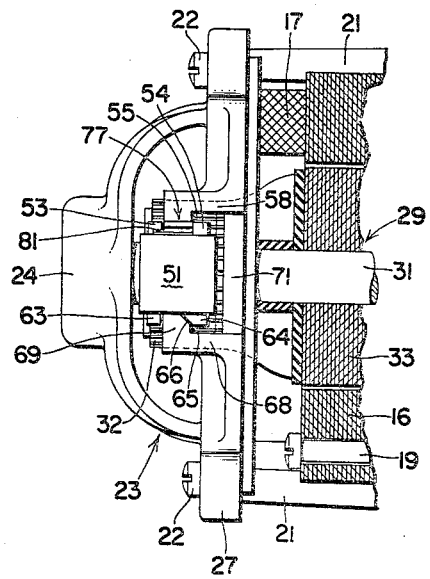
Figure 3:
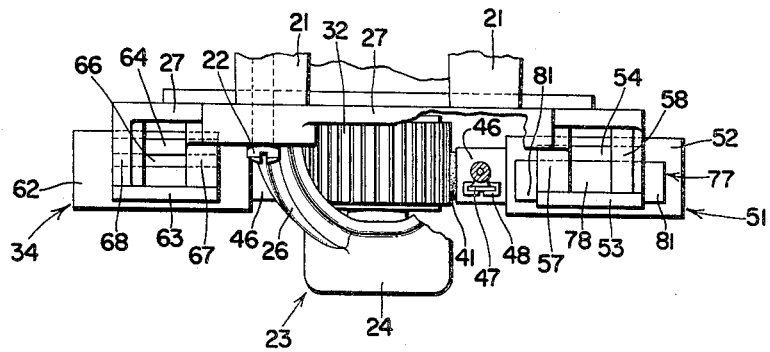
Figure 4:
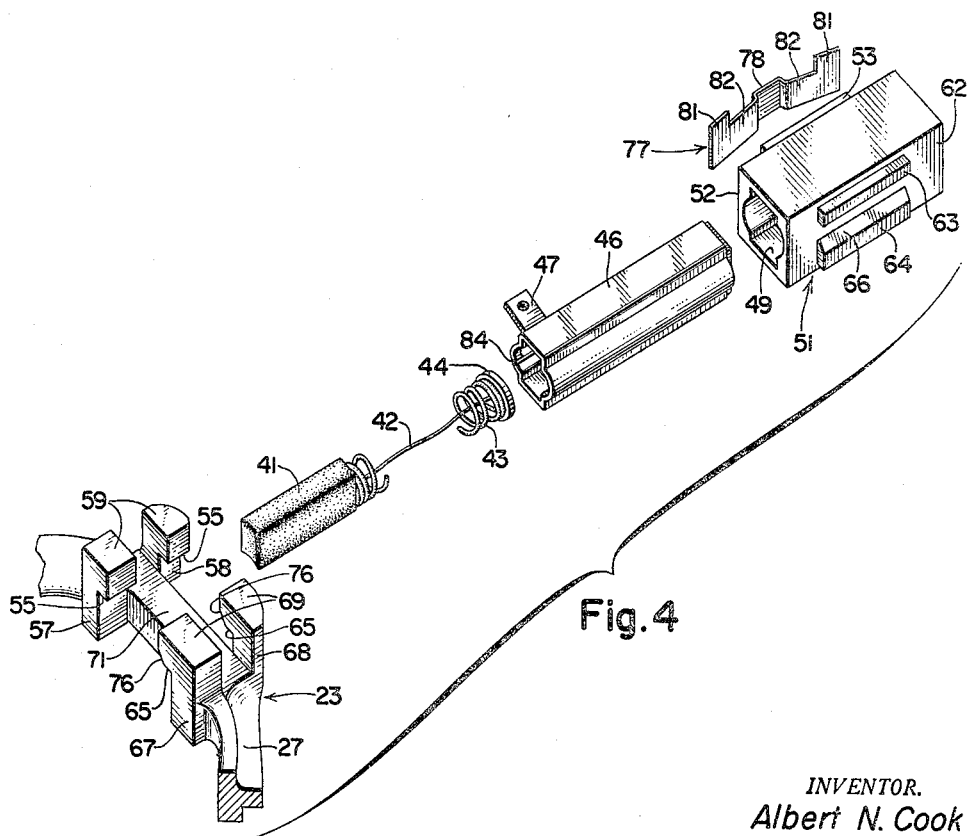

In the drawings:

FIG. 1 is an elevational end view of an electric motor equipped with an end bell and brush holders embodying the present invention, FIG. 2 is a fragmentary side elevational view, partly in section, of the electric motor shown in FIG. 1, FIG. 3 is a fragmentary top plan view, partly broken away, of the electric motor shown in FIGS. 1 and 2 and, FIG. 4 is an exploded perspective view showing parts of the end bell, the brush holder and the electric brush assembly illustrated in FIGS. 1-3 inclusive.

The electric motor illustrated in the drawings comprises, among other well-known parts, a laminated stator core 16 wound with a field coil 17. The core 16 is secured to an output end frame 18 by a plurality of axially disposed bolts 19, of which only one is shown. Four stator arms 21 extend axially from the end frame 18 and to the free ends of these arms 21 there is secured, by means of screws 22, a brush supporting end bell or part 23. The end bell 23 comprises a spider having a bearing supporting center 24 from which radiate four arms 26 on the outer ends of which is formed an annular ring 27 having four elongated arcuate holes 28 for accommodating the screws 22. An armature 29 having a shaft 31, a commutator 32, and armature lamination 33 is rotatably carried by bearings (not shown) supported by the end frame 18 and the end bell 23. The end bell 23 carries a pair of identical brush holders indicated generally by the numerals 34—34.

Each complete brush holder 34 comprises a conventional carbon brush 41 equipped with a pigtail 42 surrounded by a helical compression spring 43, the pigtail 42 and the spring 43 terminating in a circular clip 44. The brush 41, pigtail 42, spring 43 and clip 44 are received in a conventional metallic electrical conducting brush tube 46, which tube has a radially extending lug 47 to which is connected a brush lead 48 of known construction. The protruding ends of the two carbon brushes 41—41 engage opposite sides of the rotatably mounted commutator 32. The brush tube 46 is of such cross section as to receive both the circular clip 44 and the rectangular brush 41.

The metallic brush tube 46 is received in a recess 49 formed axially in an elongated insulating brush tube holder 51, the main external surface of which is in the form of a parallelepiped. One side face 52 of the tube holder 51 is provided with a pair of spaced elongated parallel ribs 53 and 54 each of which has a rectangular cross-section. The other side face 62 of the tube holder 51 is provided with two spaced parallel elongated ribs 63 and 64. The rib 63 has a rectangular cross-section, whereas, the rib 64 is not rectangular in that it has a bevelled side 66 for engaging a bevel presently to be described. The ribs 53–54 form a channel therebetween as do the ribs 63–64.

At each of two locations, the end bell 23 supports one of the brush tube holders 51, and at each location where a brush tube holder 51 is supported, the end bell 23 is provided with a tangential straight bar 71 and axially extending spaced parallel posts 57, 58, 67 and 68. The posts 57–58 form a pair at one end of the bar 71 and the posts 67–68 form a pair at the other end of the bar 71. Also posts 57–67 are positioned inwardly of the annular ring 27, whereas the posts 58–68 are positioned outwardly of the ring 27. Each of the posts 57, 58 has a head 59 having a right angle overhanging lip 55. Each of the posts 67, 68 has a head 69 which, in addition to having a right angle overhanging lip 65, also has the lower inner corner of the head 69 cut away by a matching bevel 76. In addition to the above, a bowed spring or clip member 77 is used to spring clip the brush tube holder 51 to the end bell 23. The spring 77, which may be formed from flat spring steel, has a central elevated U-shaped portion 78 and a pair of end angle lugs 81—81, each lug 81 being joined to the central portion 78 by an arm 82.

Each carbon brush 41 is mounted in the following manner. First the tube 46 is inserted into the recess 49 of the brush tube holder 51. Then the clip 44, the pigtail 42, the spring 43, and the brush 41 are inserted into the cavity of the metallic brush tube 46 in a known manner. The metallic tube 46 is provided with a longitudinal cut 84 and because the tube 46 is made of metal it is of sufficient resilience to be firmly held within the recess 49. Next the bowed spring 77 is placed against one side face of the brush tube holder 51 in such a manner that the arms 82—82 and the central portion 78 are located in the channel between the two ribs 53—54 and so that the angle lugs 81—81 (FIG. 3) are hooked around opposite ends of the rib 53. This locking of the spring 77 to the rib 53 assures that the spring 77 will not become disassembled from the brush tube holder 51. Then the holder 51 is pushed lengthwise between the posts 57–58 and the posts 67–68 in such a manner that the inner face (FIG. 4) of the holder 51 is parallel to the outer surface (FIG. 4) of the bar 71. When this occurs, the rib 54 will be located inside of the overhanging lips 55—55 of the heads 59—59 and the rib 53 will be located outside of the outer end of the heads 59—59. In other words, the overhanging portion of heads 59—59 will be in the channel between the ribs 53 and 54.

In like manner, the rib 64 will be located inside of the overhanging lips 65—65 of the heads 69—69 and the rib 63 will be outside of the outer end of the heads 69—69. In other words, the overhanging portion of the heads 69—69 will be in the channel between the ribs 63 and 64. In addition, the beveled side 66 of the rib 64 will engage the two bevels 76—76 on the heads 69—69. As the holder 51 is being pushed inwardly, the U-shaped central portion 78 of the spring 77 will be depressed by the head 59 of the post 58 of the end bell 23. Thereafter the portion 78 will spring out to occupy the space between the heads 59—59 of the posts 57 and 58. This properly positions the holder 51 with respect to the end bell 23 and causes the end of the brush 41 properly to engage the commutator 32.

When it becomes desirable to remove the brush 41, the tube 46 and the holder 51, a screw driver or other tool is used to depress the central portion 78 of the spring 77 until the portion 78 clears the head 59 of the post 58. When this occurs the holder 51, spring 77 etc., can be pulled outwardly to remove the brush holder unit from the end bell 23.

Having thus set forth the nature of the invention, what I claim herein is:

1. A brush holder unit comprising a carbon brush, an insulating brush holder body having a recess receiving said brush, two ribs formed on one side face of said insulating brush holder body and defining a channel therebetween, two ribs formed on another side face of said insulating brush holder body, and defining a channel therebetween, and a bowed spring clip member having a U-shaped central portion, a portion of said spring clip member being positoned in one of said channels the U-shaped central portion being elevated above said channel.

2. A brush holder unit comprising a carbon brush, an insulating brush holder body having a recess receiving said brush, two parallelepiped shaped ribs formed on one side face of said insulating brush holder body and defining a channel therebetween, and two ribs formed on another side face of said insulating brush holder body, one of said last named ribs having a bevel, said last named ribs defining a channel therebetween.

3. A brush holder assembly comprising in combination a metallic frame part of an electric motor, an insulating brush holder mounted directly on said metallic frame part, and a spring positioned between the metallic frame part of said electric motor and said insulating brush holder, said spring holding said insulating brush holder in proper position on said metallic frame part.

4. A brush holder assembly comprising in combination a metallic frame part of an electric motor, an insulating brush holder mounted on said metallic frame part, and a bowed spring, said bowed spring engaging both the metallic frame part of said electric motor and said insulating brush holder and thereby holding said insulating brush holder in proper position on said metallic frame part.

5. A brush holder assembly comprising in combination a metallic frame part of an electric motor, an insulating brush holder mounted directly on said metallic frame part, and a flat spring made of flat stock positioned between the metallic frame part of said electric motor and said insulating brush holder, said spring holding said insulating brush holder in proper position on said metallic frame part.

6. A brush holder assembly comprising in combination a metallic frame part of an electric motor, an insulating brush holder mounted directly on said metallic part, and a flat spring made of flat stock having a central elevated U-shaped portion and a pair of end angle lugs positioned between the metallic frame of said electric motor and said insulating brush holder, said spring holding said insulating brush holder in proper position on said metallic frame part.

7. A brush holder assembly comprising in combination a metallic frame part of an electric motor, and a brush holder unit mounted directly on said metallic frame part; said metallic frame part having posts extending axially of said motor; an overhanging lip formed on the outer end of each of said posts; said brush holder unit comprising a carbon brush; an insulating brush holder having a recess receiving said brush; a rib formed on one side face of said insulating brush holder; and a rib formed on another side face of said insulating brush holder, said metallic frame part and said insulating brush holder being so constructed and arranged that said ribs are located inside of and are engaged by said overhanging lips, thereby properly positioning said insulating brush holder and said brush with respect to said metallic frame part.

8. A brush holder assembly comprising in combination a metallic frame part of an electric motor, and a brush holder unit mounted on said metallic frame part, said metallic frame part having a pair of posts extending axially of said motor; an overhanging lip formed on the outer end of each of said posts; and a bevel formed on at least one of said overhanging lips; said brush holder unit comprising a carbon brush; an insulating brush holder having a recess receiving said brush; a rib formed on one side face of said insulating brush holder; a rib formed on another side face of said insulating brush holder, one of said ribs being in the form of a parallepiped the other of said ribs having a bevel, said metallic frame part and said insulating brush holder being so constructed and arranged that said ribs are located inside of and engaged by said overhanging lip, and the bevel on the rib engages the bevel on the overhanging lip, thereby positonin gsaid brush holder and said brush with respect to said metallic frame part.

9. A brush holder assembly comprising in combination a metallic frame part of an electric motor, and a brush holder unit mounted on said metallic frame part; said metallic frame part having a pair of posts extending axially of said motor; an overhanging lip formed on the outer end of each of said posts; said brush holder unit comprising a carbon brush; an insulating brush holder having a recess receiving said brush; a rib formed on one side face of said insulating brush holder; a rib formed on another side face of said insulating brush holder; a clip member having an angle lug at each end, said metallic frame part and said insulating brush holder being so constructed and arranged that said ribs are located inside of said overhanging lips, and the said clip member has its two angle lugs engaging opposite ends of one of said ribs.

10. A brush holder assembly comprising in combination a metallic frame part of an electric motor, and a brush holder unit mounted on said metallic frame part; said metallic frame part having a plurality of posts extending axially of said motor; an overhanging lip formed on the outer end of each of said posts; said brush holder unit comprising a carbon brush; an insulating brush holder having a recess receiving said brush; a rib formed on one side face of said insulating brush holder; a rib formed on another side face of said insulating brush holder; a clip member having a lug at each end and a central portion, said metallic frame part and said brush tube holder assembly being so constructed and arranged that two of said ribs are located inside of said overhanging lips, two of said ribs are located outside of said posts, the said clip member has its two angle lugs engaging opposite ends of one of said ribs and its central portion positioned between two of said posts to thereby position said insulating brush holder and said brush with respect to said metallic frame part.

11. A brush holder assembly comprising in combination a metallic frame part of an electric motor, and a brush holder unit mounted on said metallic frame part; said metallic frame part having a plurality of posts extending axially of said motor; an overhanging lip formed on the outer end of some of said posts; said brush holder unit comprising a carbon brush; an insulating brush holder having a recess receiving said brush; two parallelepiped shaped ribs formed on one side face of said insulating brush holder and defining a channel therebetween; two ribs formed on another side face of said insulating brush holder and defining a channel therebetween; a clip member having a lug at each end and a central portion elevated above one of the channels defined by said ribs, said motor part and said brush tube holder assembly being so constructed and arranged that two of said ribs are located inside of said overhanging lips, two of said ribs are located outside of said posts, the said clip member has its two angle lugs engaging opposite ends of one of said ribs and its central portion positioned between tow of said posts to thereby position said insulating brush holder and said brush with respect to said metallic frame part.

12. A brush holder assembly comprising in combination a metallic frame part of an electric motor, and a brush holder unit mounted on said metallic frame part; said metallic frame part comprising a plurality of posts extending axially of said motor; an overhanging lip formed on the outer end of some of said posts; said brush holder unit comprising a carbon brush; an insulating brush holder having a recess receiving said brush; two parallelepiped shaped ribs formed on one side face of said insulating brush holder and defining a channel therebetween; two ribs formed on another side face of said insulating brush holder, one of said last named ribs being in the form of a parallelepiped the other of said last-named ribs having a bevel, said last named ribs defining a channel therebetween; a clip member having a lug at each end and a central portion elevated above the channel defined by said parallelepiped shaped ribs, said metallic frame part and said insulating brush holder being so constructed and arranged that two of said ribs are located inside of said overhanging lips, two of said ribs are located outside of said posts, the said clip member has its two angle lugs engaging opposite ends of one of said ribs and its central portion positioned between two of said posts to thereby position said insulating brush holder and said brush with respect to said metallic frame part.

13. A brush holder assembly comprising in combination a metallic frame part of an electric motor, and a brush holder unit mounted on said metallic frame part; said metallic frame part comprising a bar; a pair of posts located at opposite ends of said bar and extending axially of said motor; an overhanging lip formed on the outer end of some said posts; and a bevel formed on two of said overhanging lips; said brush holder unit comprising a carbon brush; an insulating brush holder having a recess receiving said brush; two parallelepiped shaped ribs formed one one side face of said insulating brush holder and defining a channel therebetween; two ribs formed on another side face of said insulating brush holder, one of said last named ribs being in the form of a parallelepiped the other of said last named ribs having a bevel, and said last named ribs defining a channel therebetween; a clip member having a lug at each end and a central portion elevated above the channel defined by said parallelepiped shaped ribs; said metallic frame part and said brush tube holder assembly being so constructed and arranged that one side face of said insulating brush holder is parallel to said bar, two of said ribs are located inside of said overhanging lips, two of said ribs are located outside of said posts, the bevel on the rib engages the bevels on the overhanging lips, the said clip member has its two angle lugs engaging opposite ends of one of said ribs and its central portion positioned between two of said posts to thereby position said insulating brush holder and said brush with respect to said metallic frame parts.

14. A brush holder unit comprising a carbon brush, an insulating brush holder body having a recess receiving said brush, a rib formed on at least one side face of said insulating brush holder body, said rib being of a length less than the length of said insulating brush holder body, and a clip member having lugs engaging opposite ends of the said rib which is of a length less than the length of said insulating brush holder body.

15. A brush holder unit comprising a carbon brush, an insulating brush holder body having a recess receiving said brush, two ribs formed on one side face of said insulating brush holder body and defining a channel therebetween, and a clip member, a portion of said clip member being positioned in said channel.

16. A brush holder unit comprising a carbon brush, an insulating brush holder body having a recess receiving said brush, two ribs formed on one side face of said insulating brush holder body and defining a channel therebetween, two ribs on another side face of said brush holder body and defining a channel therebetween, one of said last named ribs having a bevel, and a clip member having a lug at each end, said lugs engaging opposite ends of one of said ribs, and a portion of said clip member being positioned in one of said channels.

17. A brush holder unit comprising a carbon brush, a pigtail attached at one of its ends to said brush, an electrical contact attached to the other end of said pigtail, a helical spring surrounding said pigtail and engaging said brush and said electrical contact, an insulating brush holder body having a recess receiving said brush, two ribs formed on one side face of said insulating brush holder body and defining a channel therebetween, two ribs formed on another side face of said insulating brush holder body and defining a channel therebetween one of said last named ribs having a bevel, and a clip member having a lug at each end and a central portion, the central portion of said clip member being positoned in one of said channels and said lugs positioning said clip member with respect to one of said ribs and thus with respect to said insulating brush holder.

References Cited by the Examiner
UNITED STATES PATENTS

| | | | |
|---|---|---|---|
| 1,521,605 | 1/25 | Diehl. | |
| 2,822,487 | 2/58 | Barel. | |
| 2,840,732 | 6/58 | Nottelmann et al. | 310—239 |
| 2,883,567 | 4/59 | Schneider | 310—239 |
| 2,987,639 | 6/61 | Bayless | 310—247 |
| 3,025,421 | 3/62 | Sievert | 310—245 |
| 3,028,515 | 4/62 | Cheetham | 310—239 |

MILTON O. HIRSHFIELD, *Primary Examiner.*

UNITED STATES PATENT OFFICE

CERTIFICATE OF CORRECTION

Patent No. 3,177,388                                  April 6, 1965

Albert N. Cook

It is hereby certified that error appears in the above numbered patent requiring correction and that the said Letters Patent should read as corrected below.

Column 3, line 58, after "frame" insert -- part --.

Signed and sealed this 24th day of August 1965.

(SEAL)
Attest:

ERNEST W. SWIDER                                  EDWARD J. BRENNER
Attesting Officer                                       Commissioner of Patents